United States Patent [19]

Blechschmidt et al.

[11] Patent Number: 5,755,824
[45] Date of Patent: May 26, 1998

[54] APPARATUS AND METHOD FOR MANUFACTURING LOCK WASHERS

[75] Inventors: James L. Blechschmidt, Sycamore; James F. L. Blair, St. Charles, both of Ill.

[73] Assignee: Saint Switch, Inc., St. Charles, Ill.

[21] Appl. No.: 726,681

[22] Filed: Oct. 7, 1996

Related U.S. Application Data

[63] Continuation-in-part of Ser. No. 385,118, Feb. 7, 1995, Pat. No. 5,562,378.

[51] Int. Cl.$^6$ ............................................. B21D 53/20
[52] U.S. Cl. ........................ 470/42; 470/163; 72/296; 72/335
[58] Field of Search ........................ 470/41, 42, 162, 470/163; 72/293, 295, 296, 360, 361, 420, 421, 335, 339, 461

[56] References Cited

U.S. PATENT DOCUMENTS

| | | |
|---|---|---|
| 146,488 | 1/1874 | Thomas . |
| 253,886 | 2/1882 | Over . |
| 391,410 | 10/1888 | Gamble . |
| 592,896 | 11/1897 | White . |
| 723,882 | 3/1903 | Krohn . |
| 809,044 | 1/1906 | Clark . |
| 812,497 | 2/1906 | Jahnke . |
| 974,073 | 10/1910 | Kesberger . |
| 986,110 | 3/1911 | Whiteman . |
| 1,349,404 | 8/1920 | Blake . |
| 1,386,092 | 8/1921 | Cole . |
| 1,391,378 | 9/1921 | Gaston . |
| 1,592,438 | 7/1926 | Brandt . |
| 1,715,777 | 6/1929 | Olson . |
| 1,834,247 | 12/1931 | Lillig . |
| 1,891,563 | 12/1932 | Lillig . |
| 1,963,535 | 6/1934 | Trotter . |
| 3,199,565 | 8/1965 | Poupitch ............................ 470/163 |
| 3,577,577 | 5/1971 | Zak ...................................... 470/163 |
| 3,832,881 | 9/1974 | Henzler et al. ..................... 72/420 |
| 4,781,566 | 11/1988 | Rossi et al. ........................ 72/420 |
| 4,821,556 | 4/1989 | Bakemans et al. ................. 72/420 |
| 5,259,230 | 11/1993 | Beyers ................................ 72/420 |
| 5,261,264 | 11/1993 | Jones .................................. 72/420 |

FOREIGN PATENT DOCUMENTS

| | | | |
|---|---|---|---|
| 103645 | 6/1926 | Austria . | |
| 1394517 | 2/1965 | France . | |
| 62-275541 | 11/1987 | Japan ............................. | 72/361 |
| 1113140 | 5/1989 | Japan ............................. | 72/361 |
| 139256 | 6/1930 | Switzerland . | |
| 4839 | 11/1981 | United Kingdom . | |

Primary Examiner—Lowell A. Larson
Assistant Examiner—Ed Tolan
Attorney, Agent, or Firm—Wood, Phillips, VanSanten, Clark & Mortimer

[57] ABSTRACT

An assortment of lock washers is produced from a method including the steps of (a) providing a plurality of blanks formed of generally planar resilient metal, some of the blanks having a different configuration from other of the blanks, each of the blanks including a central aperture, an outer periphery, a tab, and two locating holes spaced from the central aperture and spaced from each other a selected distance and at a selected orientation relative to the tab; (b) providing a tool having two locator pins and structure for bending a tab out of the plane of a blank; (c) orientating the two locating pins with the two locating holes of a selected blank; (d) actuating the tool to bend the tab of the selected blank out of the plane of the selected blank; and (e) repeating steps (c)–(d) for each of the blanks.

21 Claims, 2 Drawing Sheets

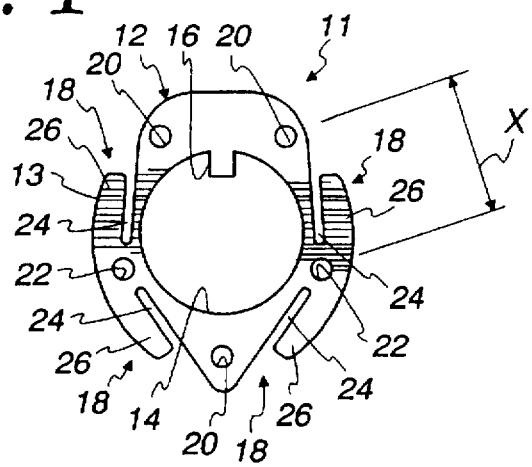
Fig. 1
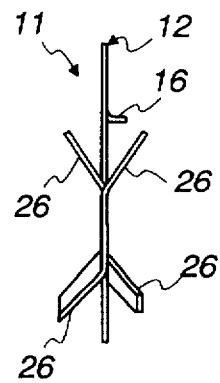
Fig. 2
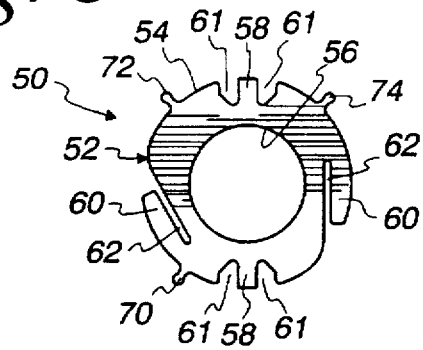
Fig. 3
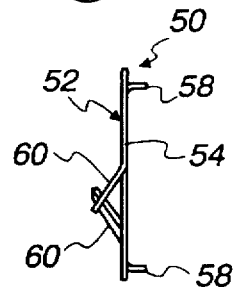
Fig. 4
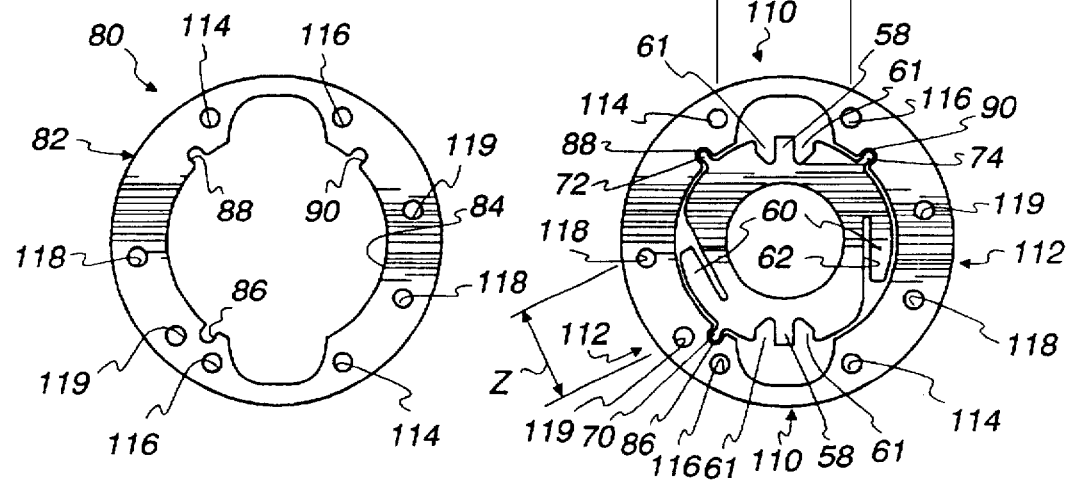
Fig. 5
Fig. 6

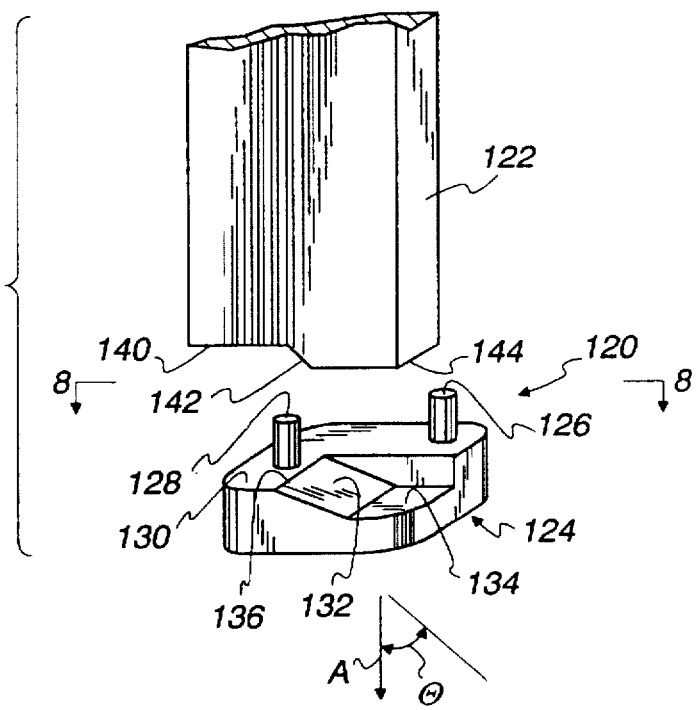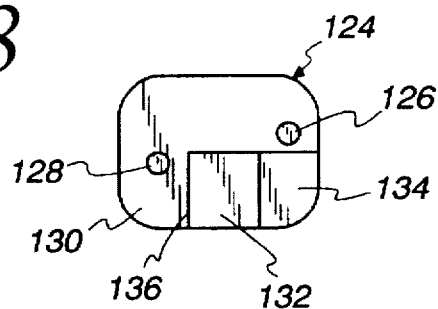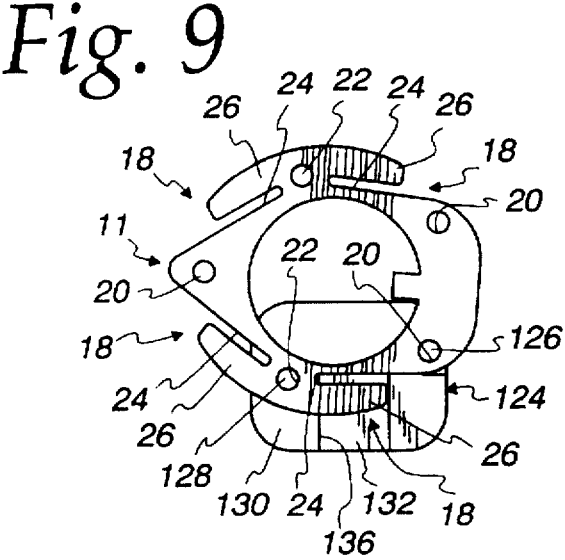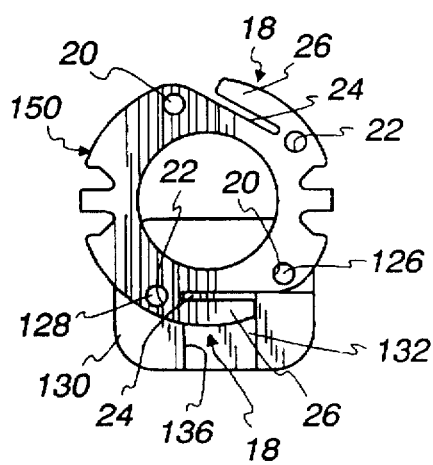

APPARATUS AND METHOD FOR MANUFACTURING LOCK WASHERS

CROSS-REFERENCE

This is a continuation-in-part of U.S. application Ser. No. 08/385,118 filed Feb. 7, 1995 now U.S. Pat. No. 5,562,378.

FIELD OF THE INVENTION

This invention relates to lock washers, and more particularly, to a cost effective method for manufacturing lock washers of various sizes, and a method of manufacturing lock washers containing various combinations of features with only a minimal capital investment.

BACKGROUND OF THE INVENTION

Lock washers are commonly used in many different fields and in connection with many different sizes and types of fasteners. Some of the variations are shaft size, thread specification, nut thickness, nut dimension across the flats, the number of flats, and torque capacity. This results in a need for a large variety of lock washer configurations, including different shapes and/or sizes.

Additionally, there are a number of ways to provide the locking capability in a lock washer. For example, it is not unusual to provide lock washers having a sharp edged or pointed tab displaced from the body of the washer so as to dig in or gouge the nut and/or surface to which the nut is applied. Some lock washers include key tabs that mate with a slot in the fastener or the surface fastened to prevent the lock washers from rotating with respect to the fastener shaft. Some lock washers include lock tabs which are displaced out of the plane defined by the body of the lock washer and have flat free edges which are adapted to abut the flats of the nut to be locked.

Although many different configurations, including different shapes and/or sizes, of lock washers exist today, lock washers have basically been manufactured by the same general method. In part, this is because most conventional varieties of lock washers utilize a tab portion of the lock washer that is displaced from the main body of the lock washer to either act as a lock tab to abut a flat of the nut to be locked or to dig in or gouge one or both of the nut to be locked and the associated flange surface.

Conventionally, each particular lock washer is manufactured using a die tool assembly that is dedicated to that particular lock washer shape and size. For example, a lock washer shape including two tabs angularly spaced 180° apart would be formed using one die tool assembly dedicated to this shape, while a lock washer shape including only one tab, or two tabs angularly spaced apart to a degree other than 180°, would require another die tool assembly dedicated to that shape. Similarly, lock washers having the same shape, but of different diameters, require a dedicated die assembly for each particular size of lock washer.

The use of dedicated die assemblies for each particular size and/or shape of lock washer has obvious implications, including the potentially high cost associated with purchasing, maintaining and storing the dedicated die assemblies. The initial capital investment to purchase dedicated die assemblies and the continuing overhead cost for storing and maintaining the dedicated die assemblies may make the production of an assortment of lock washers prohibitive for a manufacturer of lock washers. In particular, lock washers of a size and/or a configuration that require only a low volume of production due to market requirements, could be too costly to manufacture.

The present invention is directed toward overcoming one or more of the problems discussed above.

SUMMARY OF THE INVENTION

In one aspect of the present invention, a feature, such as a lock tab, for use on a lock washer is standardized so that the dimensions of the feature are independent of lock washer size and shape. A forming tool is provided to form the standard feature, such as bending a lock tab, regardless of the lock washer size and shape. In this manner, the same forming tool can be used to create a standard feature on any size and/or shape of lock washer. Further, the same forming tool can be used to create several occurrences of a standard feature on a single lock washer.

In one aspect of the present invention, a lock washer is produced from a method providing a generally planar blank formed of resilient metal. The blank includes an outer periphery, a central aperture, and a standard feature including a tab and two tool-locating holes. The two locating holes are spaced from the central aperture and spaced a selected distance from each other and at a selected orientation relative to the tab. A forming tool is orientated with respect to the two locating holes. The forming tool includes structure for bending a tab out of the plane of a blank and is used to bend the first tab out of the plane of the blank.

In another aspect of the present invention, a lock washer is produced from a method including the steps of forming a generally planar blank of resilient metal with a central aperture and an outer periphery; forming two tool-locating holes in the blank, the holes spaced from the central aperture and spaced a selected distance form each other; forming a cut in the blank, the cut defining a tab at a selected orientation relative to the two locating holes; orienting a forming tool with respect to the locating holes, the forming tool having structure for bending the tab out of the plane of a blank; and bending the tab out of the plane of the blank using the forming tool.

In another aspect of the present invention, the method further includes the steps of forming a third tool-locating hole in the blank, the third hole spaced from the central aperture and spaced the selected distance from one of the two locating holes; forming a second cut in the blank, the cut defining a second tab at said selected orientation relative to the one hole and the third hole; orienting the forming tool with respect to the third hole and the other locating hole; and bending the second tab out of the plane of the blank using the forming tool.

In another aspect of the present invention, the forming tool includes structure for cutting the blank to form the cut defining the tab. The step of forming the cut in the blank is performed using the forming tool after the step of orienting a forming tool and substantially simultaneously with the step of bending the tab.

In another aspect of the present invention, the steps of forming a blank, forming two locating holes, and forming the cut are performed using a photo etching process to form the blank, the locating holes and the cut.

In another aspect of the present invention, the steps of forming a blank, forming two locating holes, forming a cut, orienting a forming tool, and bending the tab are performed repeatedly to produce a plurality of lock washers.

In another aspect of the present invention, a lock washer is produced from a method including the steps of forming a generally planar blank of resilient metal with an outer periphery and a central aperture; forming first, second, third and fourth locating holes in the blank, the locating holes spaced from the central aperture, the first and second holes being spaced a selected distance from each other, the third and fourth holes spaced the selected distance from each other; forming a first cut in the blank, the first cut defining a first tab in the blank at a selected orientation relative to the first and second locating holes; forming a second cut in the blank, the second cut defining a second tab in the blank at the selected orientation relative to the third and fourth locating holes; orienting a forming tool with respect to the first and second locating holes, the forming tool including structure for bending the tab out of the plane of the blank; bending the first tab out of the plane of the blank using the forming tool; orienting the forming tool with respect to the third and fourth locating holes; and bending the second tab out of the plane of the blank using the forming tool.

In another aspect of the present invention, the forming tool includes structure for forming a cut to define a tab. The step of forming a first cut in the blank is accomplished substantially simultaneously with the step of bending the first tab out of the plane of the blank using the forming tool after the step of orienting the forming tool with respect to the first and second locating holes. The step of forming a second cut in the blank is accomplished substantially simultaneously with the step of bending the second tab out of the plane of the blank using the forming tool after the step of orienting the forming tool with respect to the third and fourth locating holes.

In still another aspect of the present invention, an assortment of lock washers is produced from a method including the steps of (a) providing a plurality of blanks formed of generally planar resilient metal, some of said blanks having a different configuration from other of said blanks, each of the blanks including a central aperture, an outer periphery, a tab, and two locating holes spaced from the central aperture and spaced from each other a selected distance; (b) providing a tool having two locator pins and means for bending a tab out of the plane of a blank; (c) orienting the two locator pins with respect to the two locating holes of a selected blank; (d) actuating the tool to bend the tab of the selected blank out of the plane of the selected blank and (e) repeating steps (c) through (d) for each of the blanks.

In still another aspect of the present invention, a lock washer is produced from a method including the steps of providing a generally planar blank formed of resilient metal, the blank including a central aperture and a first tab; providing a generally planar template adapted to receive the blank, the template including a first pair of locating holes that are spaced a first selected distance from each other; providing structure for orienting the blank with respect to the template, the structure including at least one lug on one of the blank and the template and at least one lug-receiving aperture on the other of the blank in the template; orienting a forming tool with respect to the first pair of locating holes in the template, the tool including structure for bending the tab out of the plane of the blanks; orienting the blank with respect to the template with the at least one lug received in the at least one lug-receiving aperture whereby said first tab is at a first selected orientation relative to said first pair of locating holes; and bending the first tab out of the plane of the blank using the forming tool.

It is an object of the invention to provide a cost effective method for manufacturing lock washers of various shapes and/or sizes.

It is also an object of the invention to provide an efficient method for manufacturing lock washers of various shapes and/or sizes with minimal capital investment.

It is a further object of the invention to provide an efficient method for manufacturing lock washers of various shapes and/or sizes with minimal continuing overhead costs for storing and maintaining the tools required to manufacture the lock washers.

BRIEF DESCRIPTION OF THE DRAWINGS

FIG. 1 is a plan view of a lock washer blank for use in one embodiment of the invention;

FIG. 2 is a right side elevation of the lock washer blank shown in FIG. 1 after it has been formed;

FIG. 3 is a plan view of another lock washer blank for use in a second embodiment of the invention;

FIG. 4 is a right side elevation of the lock washer blank shown in FIG. 3 after it has been formed;

FIG. 5 is a plan view of a template used in the second embodiment of the invention;

FIG. 6 is a plan view of the washer blank of FIG. 3 inserted into the template of FIG. 5;

FIG. 7 is a side elevation of a die tool embodying an apparatus employed in the method of the invention.

FIG. 8 a view taken along line 8—8 in FIG. 7;

FIG. 9 is a view similar to FIG. 8 but showing the lock washer blank of FIG. 1 located in the die tool of FIGS. 7 and 8; and FIG. 10 is a view similar to FIG. 9 but showing a different lock washer blank located in the die tool of FIGS. 7 and 8.

DESCRIPTION OF THE PREFERRED EMBODIMENTS

Referring to FIGS. 1 and 2, an example of a lock washer blank 11 for use in the method and apparatus of the invention will be described in detail. The lock washer blank 11 includes a ring-like body, generally designated 12, formed from a thin sheet of resilient, metallic material. The body 12 includes an outer periphery 13 and a generally circular central aperture 14. A locating tab 16 extends into the central aperture 14.

The blank 11 further includes four repetitions of a standardized feature 18. Each of the standardized features 18 includes a pair of locating holes 20 and 22, a slot 24, and a lock tab 26. The holes 20 and 22 are substantially equally spaced from the center of the aperture 14 and are located between the outer periphery 13 and the central aperture 14. Each hole 20,22 in a pair is spaced a standardized, selected distance X from the other hole 20,22 in the pair. Additionally, the orientation of the slot 24 and the lock tab 26 with respect to the pair of locating holes 20 and 22 is the same for each occurrence of the standardized feature 18.

As best seen in FIG. 2, after the lock washer blank 11 has been formed as described in greater detail below, each of the tabs 26 is displaced or bent out of the plane of the body 12.

Referring to FIG. 3, an example of a lock washer blank 50 for use in another embodiment of the method and apparatus of the invention will be described in detail. The lock washer blank 50 includes a ring-like body, generally designated 52, formed from a thin sheet of resilient, metallic material. The body 52 includes an outer periphery 54 and a generally circular, central aperture 56. The body further includes two key tabs 58 and two lock tabs 60. Notches 61 are formed in the body 52 to define the tabs 58. L-shaped slots 62 are formed in the body 52 to define the tabs 60.

The body 52 also includes three lugs 70,72,74 extending from its outer periphery 54, the importance of which will be explained below. In a preferred embodiment, a score line (not shown) may be provided at the interface between each of the lugs 70, 72 and 74 and the main portion of the body 52 to facilitate the removal of the lugs 70, 72 and 74 after the lock washer 50 has been formed.

As best seen in FIG. 4, after the lock washer blank 50 has been formed as described in greater detail below, the tabs 58 and 60 have been displaced or bent out of the plane of the body 52 and the lugs 70, 72 and 74 have been removed.

Referring to FIGS. 5 and 6, an example of a template 80 is shown for use in connection with the lock washer blank 50 during the forming process. The template 80 includes a ring-like body, generally designated 82, formed from a thin sheet of generally planar material. The body 82 includes a central aperture 84 that is adapted to receive the lock washer blank 50. The body 82 further includes lug-receiving apertures 86,88,90 for receiving the lugs 70,72,74, respectively, of the lock washer blank 50.

Referring to FIG. 6, the lock washer blank 50 has been placed in the template 80 with the lugs 70, 72 and 74 received in the apertures 86, 88 and 90 respectively. When the lock washer blank 50 is received in the template 80, the combination of the lock washer 50 and the template 80 defines two different standardized features 110 and 112, with two occurrences of each of the standardized features 110 and 112.

Each of the standardized features 110 includes a pair of locating holes 114 and 116 in the template 80, one of the key tabs 58, and two of the notches 61. Each hole 114,116 in a pair is spaced a selected distance Y from the other hole 114,116 in the pair. Additionally, the orientation of the two notches 61 and the key tab 58 with respect to the pair of locating holes 114 and 116 is the same for each occurrence of the standardized feature 110.

Each of the standardized features 112 includes a pair of locating holes 118 and 119 in the template 80, one of the lock tabs 60, and one of the slots 62. Each of the holes 118,119 in a pair is spaced a selected distance Z from the other hole 118,119 in the pair. Additionally, the orientation of the lock tab 60 and the slot 62 with respect to the pair of locating holes 118 and 119 is the same for each occurrence of the standardized feature 112.

It should be appreciated that the lock washer blank 11 and its associated standardized feature 18, and the lock washer blank 50 in combination with the template 80 and their associated standardized features 110 and 112, are presented herein by way of example only and that the method and apparatus of the invention may be applied to any of the various tabs and/or protrusions that are utilized in any form of lock washers.

Referring to FIGS. 7 and 8, one example of a die tool set 120 will be described in detail. The die tool set 120 includes a push pin 122 and a die insert 124. The die insert 124 is mountable in a lower die (not shown) with a washer blank support surface 130 flush with a support surface of the bottom die. The push pin 122 is mountable to an upper die shoe of a die assembly and movable in a direction A relative to the die insert 124 so that it may form a lock washer against the die insert 124. Conventionally, the push pin 122 will be used in connection with a stripper plate (not shown) that assists in clamping a washer blank to the lower die. The die insert 124 includes a pair of locating pins 126 and 128 extending upwardly from the flat, support surface 130. It will be appreciated by those skilled in the art that the locating pins 128 and 126 may be integral with the die insert 124 or may be mounted in the lower die (not shown), extending through the die insert 124 to assist in locating the die insert 124 relative to the lower die. A ramp surface 132 extends downwardly from the support surface 130 at an angle θ relative to the direction A. The ramp surface 132 terminates at a clearance surface 134 that is generally parallel to the surface 130. It will be appreciated by those skilled in the art that the angle θ will vary depending upon the angle of displacement from the body of the washer required for the particular standardized feature to be formed. The interface between the surfaces 130 and 132 defines an edge 136 that may be broken or radiused depending upon the particular standard feature to be formed. It will be appreciated that the surfaces 130, 132 and 134 and the edge 136 could be formed directly in a bottom die, thereby eliminating the need for a die insert.

The push pin 122 includes a flat surface 140 and a ramped surface 142 that extends downwardly from the flat surface 140 to a clearance surface 144 at an angle substantially corresponding to the ramp surface 132. In operation, the surfaces 130, 132, 140 and 142 cooperate to deform a lock washer blank when the push pin is forced in the direction A.

It will be appreciated by those skilled in the art that the die tool set 120 may take other forms, depending upon the particular standardized feature that is being bent or displaced with the die tool set 120. It will further be appreciated that the die tool set 120 is intended for use with die components that are conventionally employed in the industry, such as stripper plates, top plates, press stops, and top and bottom die shoes.

Referring to FIG. 9, one embodiment of the method and apparatus of the invention will be discussed in connection with the die tool set 120 and the standard feature 18 in the lock washer blank 11. In this example, the locating pins 126 and 128 in the die insert 124 are spaced from each other by the selected distance X which is equal to the selected distance X for the spacing of the paired locating holes 20 and 22 of the standard feature 18 in the lock washer blank 11. The locating pins 126 and 128 are received in one of the pairs of locating holes 20 and 22 to orientate the die set 120 relative to the locating holes 20 and 22, the slot 24, and the lock tab 26 of the standard feature 18. This places the lock tab 26 in the correct position over the edge 136 and the surface 132 so that when the push pin 122 is forced downward in the direction A, the lock tab 26 is bent around the edge 136 by the surface 144 until it contacts the surface 132. This sequence is then repeated for each of the three remaining occurrences of the standard feature 18. It will be appreciated that to achieve the oppositely-displaced configuration for the lock tabs 26, illustrated in FIG. 2, one surface of the lock washer blank 11 will be supported against the surface 130 when bending two of the lock tabs 26 and the opposite surface of the lock washer blank 10 will be supported against the surface 130 when bending the other two lock tabs 26.

Referring to FIG. 10, a lock washer blank 150 that is configured differently than the lock washer blank 11 is shown in connection with the die insert 124 illustrated in FIG. 9. The lock washer blank 150 has two occurrences of the standardized feature 18 discussed in connection with the lock washer blank 11. The locating pins 126 and 128 in the die insert 124 are received in a first pair of the locating holes 20 and 22 of the standard feature 18 in the lock washer blank 150. As with the lock washer blank 11, this serves to orientate the die tool set 120 relative to the holes 20 and 22, the slot 24 and lock tab 26 of the standard feature 18 in the lock washer blank 150 and places the lock tab 26 in the correct position over the edge 136 and the surface 132 so that when the push pin 122 is forced downward in the direction A, the lock tab 26 is bent around the edge 136 by the surface 144 until it contacts the surface 132.

Thus, it can be seen that by standardizing the dimensions, and relative orientations of a feature, such as with the slots 24, lock tabs 26 and their respective pairs of locating holes 20 and 22 for the standard feature 18, a single die set, such as die set 120, may be used to form each occurrence of the standardized feature on a given lock washer. Further, with reference to FIG. 10, it can be seen that such standardization allows for lock washers of different configurations, including different sizes and/or shapes to be manufactured using a single die set, such as die set 120.

Referring back to FIG. 6, a second embodiment of the method and apparatus of this invention applies the concept of standardization of features to the template 80 in combination with the lock washer blank 50. In this embodiment, a first set of die tools, such as die tools 120, would be created for the first standardized feature 110, with the locating pins 126 and 128 spaced the distance Y to match the selected distance Y for the locating holes 114 and 116 and with the location of the ramp surface 132 and the edge 136 adapted to match the standard orientation of the key tabs 58 and the notches 61 relative to the locating holes 114 and 116. This allows for the second die tool set to be orientated relative to the locating holes 114 and 116, the key tab 58 and the notch 61 to thereby place the key tab 58 in the correct position over the edge 136 and the surface 132 so that when the push pin 122 is forced downward in the direction A, the key tab 58 is bent around the edge 136 by the surface 144 until it contacts the surface 132. It will be appreciated by those skilled in the art that, because the lock tab 58 is displaced from the body of the washer blank 50 at an angle that is different than the displacement angle for the lock tabs 26, the angle θ will be different for the first die tool set. Further, the bend angle could be set to be slightly greater than the desired bend to compensate for spring-back after bending.

Similarly, a second die tool set, also like die tool set 120, could be used for the second standardized feature 112, with the locating pins 128 and 126 spaced the distance Z to match the selected distance Z for the locating holes 118 and 119 and with the location of the ramp surface 132 and the edge 136 adapted to match the standard orientation of the slots 62 and the tabs 60 relative to the locating holes 118 and 119. This allows for the first die tool set to be orientated relative to the holes 118,119, the lock tab 60 and the slots 62, thereby placing the lock tab 60 in the correct position over the edge 136 in the surface 132 so that when the push pin 122 is forced downward in the direction A, the lock tab 60 is bent around the edge 136 by the surface 144 until it contacts the surface 132.

It will be appreciated that by providing a dedicated template, such as template 80, for each particular lock washer shape and/or size so that in combination the lock washers and templates define standardized features, such as standardized features 110 and 112, that are common to the assortment of lock washer configurations, a single set of die tools, such as die tools 120, may be utilized to form each of the common standardized feature for the assortment of lock washers of different sizes and/or shapes.

In a preferred embodiment of the method and apparatus of the invention, all of the features of a lock washer blank, such as the central apertures 14 and 56, the locating holes 20 and 22, the notch 61 and slots 24 and 62, and the tabs 16, 26, 58 and 60 of the lock washer blanks 11 and 50, will be formed from a sheet of resilient material prior to bending the tabs with the die tool set, such as die tool set 120. In a preferred embodiment, these features will be preformed using any of the photoetching processes that are known in the industry. However, it should also be appreciated that the notches, slots and tabs, such as notch 61 and slots 24 and 62 and tabs 26, 58 and 60, could be formed substantially simultaneously with the bending of the tabs by a die tool set that is adapted to cut the notches and slots in addition to bending the tabs.

Still other aspects, objects, and advantages of the present invention can be obtained from a study of the specification, the drawings, and the appended claims.

What is claimed is:

1. A method for producing a lock washer, comprising the steps of:

providing a generally planar blank formed of resilient metal, said blank including an outer periphery, a central aperture, and a standard feature including a tab and two locating holes, said locating holes spaced from the central aperture, said locating holes spaced a selected distance from each other and in a selected orientation relative to the tab, said blank further including a second occurrence of the standard feature including a second tab and third and fourth locating holes, said third and fourth locating holes spaced from said central aperture, said third and fourth locating holes spaced the selected distance from each other and at the selected orientation relative to said second tab;

orienting a forming tool with respect to said locating holes, said forming tool having means for bending a tab out of the plane of the blank;

bending said tab out of the plane of the blank using said forming tool;

orienting said forming tool with respect to said third and fourth locating holes; and bending said second tab out of the plane of the blank using said forming tool.

2. The method of claim 1, wherein said central aperture is generally circular around a center, and said locating holes are substantially equally spaced from said center and located between the outer periphery and the central aperture.

3. A method for producing a lock washer, comprising the steps of:

forming a generally planar blank of resilient metal with a central aperture and an outer periphery;

forming two tool locating holes in said blank, said holes spaced from said central aperture, said holes spaced a selected distance from each other;

forming a first cut in said blank, said cut defining a first tab at a selected orientation relative to said two locating holes;

forming a third tool locating hole in said blank, said third hole spaced from said central aperture, said third hole being spaced said selected distance from one of said two locating holes;

forming a second cut in said blank, said cut defining a second tab at said selected orientation relative to said one hole and said third hole;

orienting a forming tool with respect to said locating holes, said forming tool having means for bending a tab out of the plane of the blank;

bending said first tab out of the plane of the blank using said forming tool;

orienting said forming tool with respect to the third hole and said another locating hole; and bending the second tab out of the plane of the blank using said forming tool.

4. The method of claim 3, wherein:

said central aperture is generally circular around a center;

said locating holes are substantially equally spaced from said center and are located between said outer periphery and said central aperture; and said cutting step forms a substantially L-shaped cut in said blank.

5. The method of claim 3, wherein said forming tool includes means for cutting said blank to form said cuts defining said tabs, and said step of forming a first cut in said blank is performed using said forming tool after said step of orienting a forming tool with respect to said two locating holes and substantially simultaneously with said step of bending said first tab.

6. The method of claim 3, wherein said steps of forming a blank, forming two locating holes, forming a first cut, forming a third locating hole, and forming a second cut are performed using a photoetching process to form said blank, said locating holes, and said cuts.

7. The method of claim 3, wherein said all of said steps are performed repeatedly to produce a plurality of lock washers.

8. A method for producing a lock washer, comprising the steps of:

(a) forming a generally planar blank of resilient metal with an outer periphery and a central aperture;

(b) forming first, second, third and fourth locating holes in said blank, said locating holes spaced from said central aperture, said first and second holes being spaced a selected distance from each other, said third and forth holes spaced the selected distance from each other;

(c) forming a first cut in said blank, said first cut defining a first tab in said blank at a selected orientation relative to said first and second locating holes;

(d) forming a second cut in said blank, said second cut defining a second tab in said blank at said selected orientation relative to said third and fourth locating holes;

(e) orienting a forming tool with respect to said first and second locating holes, said forming tool having means for bending a tab out of the plane of the blank;

(f) bending said first tab out of the plane of the blank using said forming tool;

(g) orienting said forming tool with respect to said third and fourth locating holes; and (h) bending said second tab out of the plane of the blank using said forming tool.

9. The method of claim 8, wherein:

said central aperture is generally circular around a center;

said locating holes are substantially equally spaced from said center and located between said central aperture and said outer periphery; and said cutting steps form substantially L-shaped cuts in said blank.

10. The method of claim 8, wherein:

said forming tool includes means for forming a cut to define a tab;

step (c) is accomplished substantially simultaneously with step (f) after step (e) using said forming tool; and step (d) is accomplished substantially simultaneously with step (h) after step (g) using said forming tool.

11. The method of claim 10, wherein said forming tool is a die assembly which both cuts said blank and bends the tab formed by said cut.

12. The method of claim 8, wherein a plurality of blanks of different configurations are provided, and steps (b) through (h) are practiced on each of said blanks.

13. The method of claim 8, wherein:

said first tab is located between said first and second holes; and said second tab is located between said third and forth holes.

14. The method of claim 8, wherein said first and second tabs are bent out of the plane of the blank in opposite directions.

15. A method for producing an assortment of lock washers, comprising the steps of:

(a) providing a plurality of blanks formed of generally planar resilient metal, some of said blanks having a different configuration from other of said blanks, each of said blanks including a central aperture, an outer periphery, a tab, and two locating holes spaced from said central aperture and spaced from each other a selected distance and at a selected orientation relative to said tab;

(b) providing a tool having two locator pins and means for bending a tab out of the plane of a blank;

(c) orienting said two locator pins with respect to said two locating holes of a selected blank;

(d) actuating the tool to bend the tab of the selected blank out of the plane of the selected blank; and (e) repeating steps (c) through (d) for each of said blanks.

16. The method of claim 15, wherein for each of said blanks said central aperture is generally circular around a center and said locating holes are substantially equally spaced from said center and located between said central aperture and said periphery.

17. A method for producing a lock washer, comprising the steps of:

providing a generally planar blank formed of resilient metal, said blank including a central aperture and a first tab;

providing a generally planar template adapted to receive said blank, said template including a first pair of locating holes, said locating holes spaced a first selected distance from each other;

providing means for orienting said blank with respect to said template, said orienting means including at least one lug on one of said blank and said template and at least one lug-receiving aperture on the other of said blank and said template;

orienting a forming tool with respect to said first pair of locating holes in said template, said tool having means for bending a tab out of the plane of a blank;

orienting said blank with respect to said template with said at least one lug received in said at least one lug-receiving aperture whereby said first tab is at a first selected orientation relative to said first pair of locating holes; and bending said first tab out of the plane of said blank using said forming tool.

18. The method of claim 17 further comprising the steps of:

providing said blank with a second tab; and providing said template with a second pair of locating holes, said locating holes of said second pair spaced a second selected distance from each other;

orienting said forming tool with respect to said second pair of locating holes in said template;

orienting said blank with respect to said template with said at least one lug received in said at least one lug-receiving aperture whereby said second tab is at a second selected orientation relative to said second pair of locating holes; and bending said second tab out of the plane of said blank using said forming tool.

19. The method of claim 18 wherein said first and said second selected distances are equal and said first and second selected orientations are the same.

20. The method of claim 18 wherein said first and said second selected distances are not equal.

21. The method of claim 18 wherein said step of orienting said blank with respect to said template is performed prior to said step of orienting a forming tool with respect to said first pair of locating holes in said template.

* * * * *